US011931738B2

(12) United States Patent
Lahmann et al.

(10) Patent No.: US 11,931,738 B2
(45) Date of Patent: Mar. 19, 2024

(54) SEQUENCED DROPLET EJECTION TO DELIVER FLUIDS

(71) Applicant: HEWLETT-PACKARD DEVELOPMENT COMPANY, L.P., Spring, TX (US)

(72) Inventors: John Lahmann, Corvallis, OR (US); Pavel Kornilovich, Corvallis, OR (US); Silam J Choy, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 806 days.

(21) Appl. No.: 17/045,873

(22) PCT Filed: Nov. 22, 2018

(86) PCT No.: PCT/US2018/062365
§ 371 (c)(1),
(2) Date: Oct. 7, 2020

(87) PCT Pub. No.: WO2019/209374
PCT Pub. Date: Oct. 31, 2019

(65) Prior Publication Data

US 2021/0138458 A1 May 13, 2021

Related U.S. Application Data

(63) Continuation-in-part of application No. PCT/US2018/042411, filed on Jul. 17, 2018, which is
(Continued)

(51) Int. Cl.
*B01L 3/00* (2006.01)

(52) U.S. Cl.
CPC ..... *B01L 3/50273* (2013.01); *B01L 3/502715* (2013.01); *B01L 2200/027* (2013.01);
(Continued)

(58) Field of Classification Search
CPC .......... B01L 3/50273; B01L 3/502715; B01L 2200/027; B01L 2300/0645; B01L 2400/0406; B01L 2400/0442
See application file for complete search history.

(56) References Cited

U.S. PATENT DOCUMENTS 4,329,698 A 5/1982 Smith
4,614,953 A 9/1986 Lapeyre
(Continued)

FOREIGN PATENT DOCUMENTS

CA 2970491 A1 6/2016
EP 0470202 B1 6/1994
(Continued)

OTHER PUBLICATIONS

D. Wallace et al. "Ink-Jet as a MEMS Manufacturing Tool"; Micro Fab Technologies.
(Continued)

*Primary Examiner* — Jill A Warden
*Assistant Examiner* — John McGuirk
(74) *Attorney, Agent, or Firm* — Foley & Lardner LLP

(57) ABSTRACT

An example method includes providing fluid to a chamber. The chamber feeds a first channel terminating at a first droplet ejector and a second channel terminating at a second droplet ejector. The method further includes sequencing ejection of droplets at the first droplet ejector and the second droplet ejector to induce negative pressure to provide a sequenced output flow of the fluid through the first channel to a first target microfluidic network and through the second channel to a second target microfluidic network, and controlling the first and second target microfluidic networks to perform an analytical process with the fluid.

7 Claims, 7 Drawing Sheets

Related U.S. Application Data a continuation-in-part of application No. PCT/US2018/042416, filed on Jul. 17, 2018, which is a continuation-in-part of application No. PCT/US2018/042408, filed on Jul. 17, 2018, which is a continuation-in-part of application No. PCT/US2018/029169, filed on Apr. 24, 2018.

(52) U.S. Cl.
CPC .................. *B01L 2300/0645* (2013.01); *B01L 2400/0406* (2013.01); *B01L 2400/0442* (2013.01)

(56) References Cited

U.S. PATENT DOCUMENTS

| | | | |
|---|---|---|---|
| 4,877,745 | A | 10/1989 | Hayes et al. |
| 5,032,850 | A | 7/1991 | Andeen et al. |
| 5,587,128 | A | 12/1996 | Wilding et al. |
| 5,892,524 | A | 4/1999 | Silverbrook |
| 6,432,694 | B1 | 8/2002 | Malmqvist |
| 6,450,775 | B1 | 9/2002 | Hutchinson et al. |
| 6,464,336 | B1 | 10/2002 | Sharma |
| 6,550,892 | B1 | 4/2003 | Sharma |
| 7,125,447 | B2 | 10/2006 | Sugita et al. |
| 7,179,423 | B2 | 2/2007 | Böhm et al. |
| 7,456,012 | B2 | 11/2008 | Ryttsén et al. |
| 7,763,453 | B2 | 7/2010 | Clemmens et al. |
| 8,158,083 | B2 | 4/2012 | Krug et al. |
| 8,287,112 | B2 | 10/2012 | Van Thillo et al. |
| 8,308,339 | B2 | 11/2012 | Karpetsky et al. |
| 8,426,209 | B2 | 4/2013 | Butler et al. |
| 8,697,009 | B2 | 4/2014 | Saltsman et al. |
| 8,746,285 | B2 | 6/2014 | Hong et al. |
| 8,894,761 | B2 | 11/2014 | Birecki et al. |
| 9,138,714 | B2 | 9/2015 | Samper et al. |
| 9,410,977 | B2 | 8/2016 | Stone et al. |
| 9,523,013 | B2 | 12/2016 | Reboa, Jr. |
| 9,663,819 | B2 | 5/2017 | Jovanovich et al. |
| 2001/0016322 | A1 | 8/2001 | Caren et al. |
| 2002/0092767 | A1 | 7/2002 | Bjornson et al. |
| 2002/0127736 | A1 | 9/2002 | Chou et al. |
| 2002/0153251 | A1 | 10/2002 | Sassi et al. |
| 2003/0180449 | A1 | 9/2003 | Wiktorowicz et al. |
| 2005/0106066 | A1 | 5/2005 | Saltsman et al. |
| 2006/0244799 | A1 | 11/2006 | Sasa et al. |
| 2007/0035579 | A1 | 2/2007 | Bibl et al. |
| 2007/0052759 | A1 | 3/2007 | Park et al. |
| 2007/0095393 | A1 | 5/2007 | Zucchelli et al. |
| 2007/0111303 | A1 | 5/2007 | Inoue et al. |
| 2008/0114225 | A1 | 5/2008 | Rabinovitz |
| 2008/0136862 | A1 | 6/2008 | Kawabe et al. |
| 2008/0252679 | A1 | 10/2008 | Pierik et al. |
| 2009/0075390 | A1 | 3/2009 | Linder et al. |
| 2009/0130745 | A1 | 5/2009 | Williams et al. |
| 2009/0148933 | A1 | 6/2009 | Battrell et al. |
| 2009/0278895 | A1 | 11/2009 | Kamito |
| 2010/0143905 | A1 | 6/2010 | Lane et al. |
| 2010/0214383 | A1 | 8/2010 | Silverbrook et al. |
| 2011/0064613 | A1 | 3/2011 | Chen |
| 2011/0143968 | A1 | 6/2011 | Chen et al. |
| 2012/0113197 | A1 | 5/2012 | Kashu et al. |
| 2012/0115738 | A1 | 5/2012 | Zhou et al. |
| 2014/0051604 | A1 | 2/2014 | Davies et al. |
| 2014/0221239 | A1 | 8/2014 | Carman et al. |
| 2015/0273470 | A1 | 10/2015 | Hoffmann |
| 2015/0292988 | A1* | 10/2015 | Bharadwaj ............ B01L 3/0241 506/40 |
| 2015/0298119 | A1 | 10/2015 | Williams et al. |
| 2016/0045914 | A1 | 2/2016 | Abate et al. |
| 2016/0175864 | A1 | 6/2016 | Bloc |
| 2016/0195524 | A1 | 7/2016 | Cowan et al. |
| 2016/0341337 | A1 | 11/2016 | Govyadinov et al. |
| 2017/0021620 | A1 | 1/2017 | Oikawa et al. |
| 2017/0165972 | A1 | 6/2017 | Lee |
| 2017/0205438 | A1 | 7/2017 | Peters |
| 2017/0246867 | A1 | 8/2017 | Govyadinov et al. |
| 2018/0015473 | A1 | 1/2018 | Bharadwaj et al. |
| 2018/0017175 | A1 | 1/2018 | Liang et al. |
| 2018/0030515 | A1 | 2/2018 | Regev et al. |
| 2018/0052082 | A1 | 2/2018 | Groll et al. |
| 2020/0207112 | A1 | 7/2020 | Yamanaka et al. |
| 2020/0216840 | A1 | 7/2020 | Tanno et al. |
| 2021/0008890 | A1 | 1/2021 | Bhatt et al. |
| 2021/0046754 | A1 | 2/2021 | Ungerer et al. |
| 2021/0331482 | A1 | 10/2021 | Govyadinov et al. |

FOREIGN PATENT DOCUMENTS

| | | | |
|---|---|---|---|
| EP | 0990525 | B1 | 8/2006 |
| JP | 5007016 | B2 | 8/2012 |
| KR | 20110035113 | A | 4/2011 |
| WO | WO-1997011133 | A1 | 3/1997 |
| WO | WO-2008024319 | A2 | 2/2008 |
| WO | WO-2011094577 | A3 | 11/2011 |
| WO | WO-2013135878 | A1 | 9/2013 |
| WO | WO-2013176767 | A1 | 11/2013 |
| WO | WO-2016175864 | A1 | 11/2016 |
| WO | WO-2017091213 | A1 | 6/2017 |
| WO | WO-2017180660 | A1 | 10/2017 |

OTHER PUBLICATIONS

Li Baoqing et al., "Piezoelectric-driven droplet impact printing with an interchangeable microfluidic cartridge", Sep. 1, 2015, Biomicrofluidics 9, 054101.

Liu Robin et al., Self-contained, fully integrated biochip for sample preparation, Polymerase Chain Reaction Amplification, and DNA Microarray Detection, Feb. 25, 2004.

Ly et al. Automated Reagent-Dispensing System for Microfluidic Cell Biology Assays; 2013, Journal of Laboratory Automation, vol. 18, No. 6.

Perch-Nielsen R. Ivan et al., A total integrated biochip system for detection of SNP in Cancer, Jan. 11-14, 2010, Proceedings of the 3rd International Conference on the Development of BME in Vietnam.

Rocker Scientific Co. Ltd.; Rocker products; Filtration apparatus/VF11 product sheet, retrieved Oct. 1, 2018.

Tian Qingchang et al., An integrated temporary negative pressure assisted microfluidic chip for DNA isolation and digital PCR detection, Sep. 14, 2015, RSC Advances.

Welch David et al., Real-time feedback control of pH within microfluidics using integrated sensing and actuation, Jan. 23, 2014, Lab on Chip.

Xu et al. A self-contained polymeric cartridge for automated biological sample preparation; Institute of Bioengineering and Nanotechnology, 31 Biopolis Way, The Nanos, Singapo.

Zheng et al. Micro-reagent Dispensing Method Based on Pulse Driving & Controlling of Micro-fluids Technology and Application Research; School of Mechanical Engineering, Nanjin.

Zhou Hongbo et al., "A facile on-demand droplet microfluidic system for lab-on-a-chip applications", Microfluid Nanofluid 2014 16:667-675.

* cited by examiner

SEQUENCED DROPLET EJECTION TO DELIVER FLUIDS

BACKGROUND

Microfluidic systems may be used to perform a variety of chemical, biological, and biochemical processes, such as nucleic acid testing. Delivery of reagents to a process site may be accomplished in a variety of ways. In one type of system, reagents are drawn through microfluidic channels by a downstream pump.

DETAILED DESCRIPTION

Figure 1:
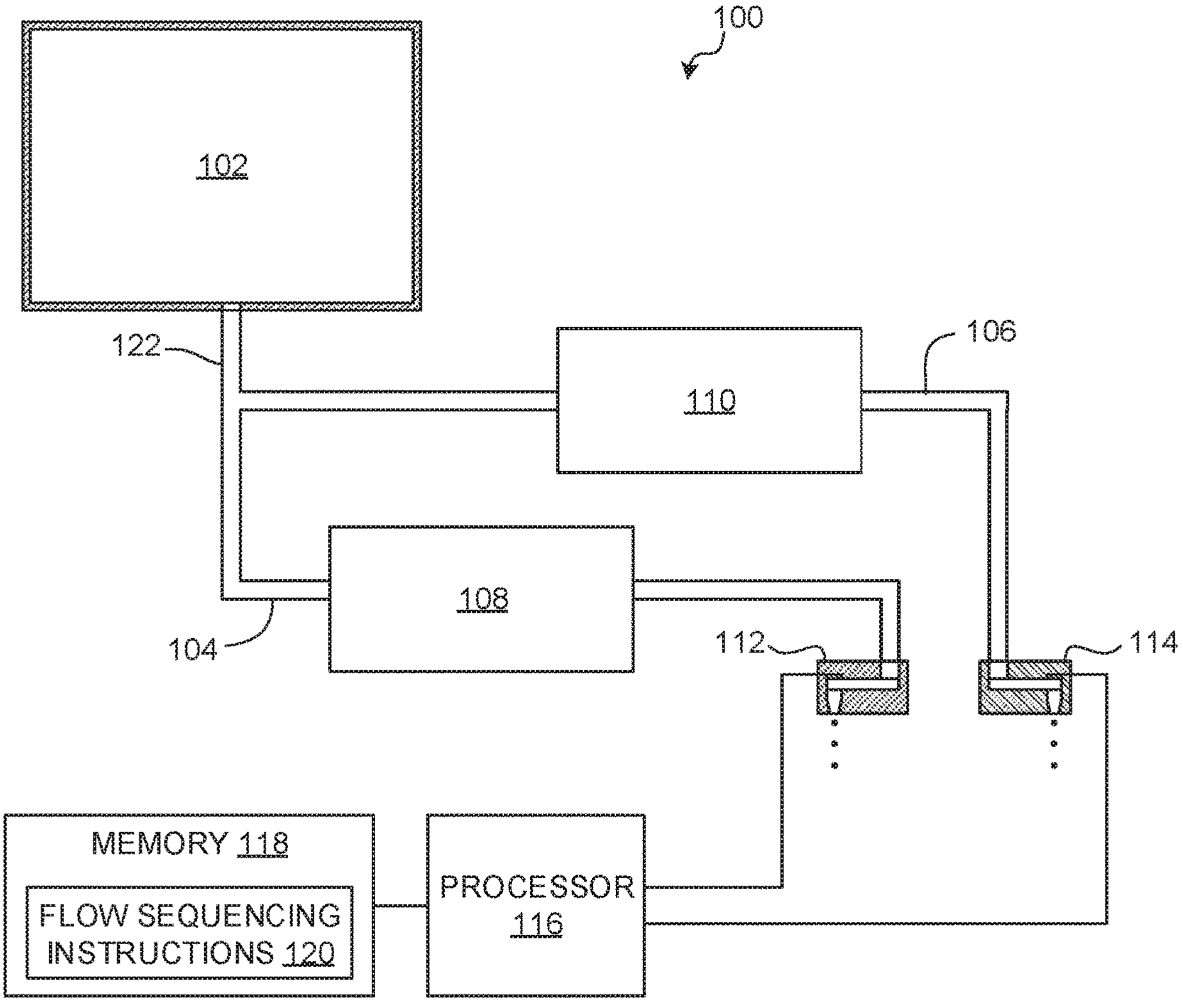
FIG. 1 is a schematic diagram of an example system that uses droplet ejection to sequence flow of fluid through microfluidic networks.

Microfluidic systems often include a network of microfluidic channels. Flow rates in a typical system are often interdependent. That is, fluid flow induced by a downstream pump that draws a reaction product from a channel where a reaction takes place often dictates upstream flow of the reagents into the channel. Changing flow rate through such a channel means that input flow rates of reagents are also changed. The geometry of a microfluidic network, relative sizes of channels, and other factors may determine the interdependency of flow rates.

The same interdependency applies to parallel microfluidic networks that receive fluid from a common source. Changing a flow rate in one network often affects a flow rate in another network.

Fluid control components (e.g., valves, pumps, etc.) are often provided to microfluidic channels to control flow rates that would otherwise be interdependent. However, such control elements add complexity.

To reduce the need for such fluid control components and provide for simplified control of a microfluidic analytical process, such as a nucleic acid testing process, droplet ejectors or arrays thereof are used to create negative pressure to draw a fluid, such as a reactant or intermediate reaction product, from a mesofluidic chamber to different downstream targets, such as microfluidic networks for nucleic acid amplification. Flow through different downstream targets is decoupled.

Droplet ejectors or arrays thereof may also be used to provide input fluid to a mesofluidic chamber upstream of the targets. The mesofluidic chamber may be used to mix, react, accumulate, concentrate, or perform other fluid manipulation on different inputted fluids. Input fluid flow is decoupled from flow though downstream targets.

Fluid flow through different downstream targets may be sequenced according to the needs of an analytical process implemented. Input fluid flow may also be sequenced, so that suitable source fluid for downstream targets is generated.

A wide variety of analytical processes, such as nucleic acid testing processes, may thus be performed using controllably synchronized fluid flow without the need for valves or other mechanisms.

In the examples, a device includes a non-transitory machine-readable medium including instructions that when executed by a processor cause the processor to control input of a fluid to a chamber that feeds a first channel terminating at a first droplet ejector and a second channel terminating at a second droplet ejector. The instructions are further to cause the processor to sequence an ejection of droplets at the first droplet ejector and the second droplet ejector to induce negative pressure to provide a sequenced output flow of the fluid through the first channel to a first target microfluidic network and through the second channel to a second target microfluidic network. The instructions are further to cause the processor to initiate an analytical process at the first and second target microfluidic networks.

The instructions can further sequence input flow of different fluids into the chamber at different times.

The instructions can further sequence ejection of droplets at the first droplet ejector and the second droplet ejector based on the sequenced input flow of the different fluids.

The instructions can further delay ejection of droplets at the first droplet ejector and the second droplet ejector by a hold time of the fluid in the chamber or a determined volume of fluid in the chamber.

The instructions can further initiate a nucleic acid testing process as the analytical process.

The instructions can further perform a first portion of a nucleic acid testing process at the first target microfluidic network and perform a second portion of the nucleic acid testing process at the second target microfluidic network.

The device can further include a processor and an interface electrically connected to the processor. The processor is electrically connected to the non-transitory machine-readable medium. The interface is to receive electrical connection of a removable cartridge. The removable cartridge includes the chamber, the first channel, the first droplet ejector, the second channel, the second droplet ejector, the first target microfluidic network, and the second target microfluidic network.

The device can further include an input droplet ejector to provide the fluid to the chamber.

In some examples, a device includes a housing; a chamber at the housing; a first channel communicating with the chamber; a first target microfluidic network communicating with the first channel; a first droplet ejector at an end of the first channel; a second channel communicating with the chamber; a second target microfluidic network communicating with the second channel; a second droplet ejector at an end of the second channel; and a signal interface at the housing and electrically connected to the first and second droplet ejectors. The chamber is to receive a fluid and the first target microfluidic network is to perform an analytical process with the fluid. The second target microfluidic network is to cooperate with the first target microfluidic network to perform the analytical process. The signal interface is to receive a signal to sequence ejection of droplets at the first and second droplet ejectors to draw the fluid through to first and second target microfluidic networks.

FIG. 1 shows an example system 100 that uses droplet ejection to sequence flow of fluid through microfluidic networks to perform an analytical process, such as a nucleic acid testing process that uses nucleic acid amplification.

The system 100 includes a chamber 102, a first microfluidic channel 104 in communication with the chamber 102, a second microfluidic channel 106 in communication with from the chamber 102, a first target microfluidic network 108 at the first channel 104, a second target microfluidic network 110 at the second channel 106, a first droplet ejector 112 positioned at the first channel 104, and a second droplet ejector 114 positioned at the second channel 106.

The chamber 102 is to receive and contain a fluid. The chamber 102 is mesofluidic in scale relative to the channels 104, 106, target microfluidic networks 108, 110, and the droplet ejectors 112, 114, which are microfluidic in scale. The chamber 102 may be provided with a fluid or a sequence of fluids. A sequence of fluids may be provided by controlling fluid flow into the chamber 102, by performing a reaction in the chamber 102, or by performing other fluid manipulation with the chamber 102. The chamber 102 may be vented to allow pressure equalization in the chamber 102 as fluid is moved into and out of the chamber 102.

The fluid provided to the chamber 102 may be a reagent, such as a chemical solution, a sample (e.g., a deoxyribonucleic acid or DNA sample, a ribonucleic acid or RNA sample, etc.), or other material. The term "fluid" is used herein to denote a material that may be jetted, such as aqueous solutions, suspensions, solvent solutions (e.g., alcohol-based solvent solutions), oil-based solutions, or other materials.

The first and second channels 104, 106 may originate at the chamber 102 or may branch from a common channel 122 that originates at the chamber 102. Irrespective of the specific structure of the first and second channels 104, 106, the first and second channels 104, 106 are capable of communicating fluid from the chamber 102. The first channel 104 terminates at the first droplet ejector 112 and the second channel 106 terminates at the second droplet ejector 114.

The channels 104, 106, 122 may be primed with fluid to communicate negative pressure from the droplet ejectors 112, 114 to the chamber 102. The priming fluid may include a drive fluid that is not used by a process implemented by a target microfluidic network 108, 110 or a working fluid that is used by a target microfluidic network 108, 110. A channel 104, 106, 122 may be preloaded with any number and sequence of slugs of drive and working fluids.

The first and second droplet ejectors 112, 114 may be formed at a substrate and such a substrate may have multiple layers. The substrate may include silicon, glass, photoresist (e.g., SU-8), or similar materials. A droplet ejector 112, 114 may include a jet element, such as a resistive heater, a piezoelectric element, or similar device that may implement inkjet droplet jetting techniques, such as thermal inkjet (TIJ) jetting. The jet element is controllable to draw fluid from the respective channel 104, 106 to jet fluid droplets out an orifice. An array having any number of droplet ejectors 112, 114 may be provided to a respective channel 104, 106.

The first droplet ejector 112 is positioned at the first channel 104 downstream of the first target microfluidic network 108. The first droplet ejector 112 may be positioned at an end of the first channel 104, such that the first target microfluidic network 108 is between the chamber 102 and the first droplet ejector 112. When driven, the first droplet ejector 112 draws fluid from the chamber 102 through the first channel 104 and into the first target microfluidic network 108 by low pressure generated by droplet ejection. The first droplet ejector 112 may be fed by a fluid reservoir connected between the first channel 104 and the droplet ejector 112. Such a fluid reservoir may supply a volume of drive fluid to be ejected.

The second droplet ejector 114 is positioned at the second channel 106 downstream of the second target microfluidic network 110. The second droplet ejector 114 may be positioned at an end of the second channel 106, such that the second target microfluidic network 110 is between the chamber 102 and the second droplet ejector 114. When driven, the second droplet ejector 114 draws fluid from the chamber 102 through the second channel 106 and into the second target microfluidic network 110 by low pressure generated by droplet ejection. The second droplet ejector 114 may be fed by a fluid reservoir connected between the second channel 106 and the droplet ejector 114. Such a fluid reservoir may supply a volume of drive fluid to be ejected.

The first droplet ejector 112 may provide capillary action to resist backflow of fluid from the first channel 104 into the second channel 106. That is, when the second droplet ejector 114 is driven and the first droplet ejector 112 is not driven, resistance and counteracting capillary pressure at the first droplet ejector 112 due to capillary action may prevent fluid in the first channel 104 from being drawn back into the chamber 102 or into the second channel 106. Likewise, the second droplet ejector 114 may provide capillary action to resist backflow of fluid from the second channel 106.

A target microfluidic network 108, 110 may include a passive component, such as a network of microfluidic channels, which may be made of silicon, silicon oxide, photoresist, polydimethylsiloxane (PDMS), cyclic olefin copolymer (COO), other plastics, glass, or other materials that may be made using micro-fabrication technologies. The target microfluidic network 108, 110 may contain a solid compound to interact with fluid delivered by the respective channel 104, 106. A solid compound may be solid in bulk, may be a powder or particulate, may be integrated into a fibrous material, or similar.

A target microfluidic network 108, 110 may include an active component. Examples of active components include a pump, sensor, mixing chamber, channel, heater, reaction chamber, droplet ejector, or similar component to perform further action on fluid delivered by the respective channel 104, 106.

In various examples, a target microfluidic network 108, 110 includes microfluidic structure to implement a nucleic acid testing process, such as process that uses nucleic acid amplification (NAT), such as polymerase chain reaction (PCR), real-time or quantitative polymerase chain reaction (qPCR), reverse transcription polymerase chain reaction (RT-PCR), loop mediated isothermal amplification (LAMP), and similar.

The system 100 further includes a processor 116 and memory 118 connected to the processor. The processor 116 is connected to the droplet ejectors 112, 114 to provide a signal to sequence ejection of droplets by the droplet ejectors 112, 114. The memory 118 stores flow sequencing instructions 120 to generate such a signal.

The processor 116 may include a central processing unit (CPU), a microcontroller, a microprocessor, a processing core, a field-programmable gate array (FPGA), or a similar device capable of executing instructions. The processor 116 cooperates with the memory 118, which includes a non-transitory machine-readable medium that may be an electronic, magnetic, optical, or other physical storage device that encodes executable instructions. The machine-readable medium may include, for example, random access memory (RAM), read-only memory (ROM), electrically-erasable programmable read-only memory (EEPROM), flash memory, a storage drive, an optical disc, or similar.

The flow sequencing instructions 120 are to sequence ejection of fluid droplets at the first droplet ejector 112 and the second droplet ejector 114 to induce negative pressure to provide a sequenced output flow of the fluid through the first channel 104 to the first target microfluidic network 108 and through the second channel 106 to the second target microfluidic network 110.

The sequencing of droplet ejection allows the first and second target microfluidic networks 108, 110 to perform an analytical process with a sequenced delivery of fluid. The processor 116 may further control the first and second target microfluidic networks 108, 110 to perform the analytical process, such as by controlling a heater or other active component at a microfluidic network 108, 110. Control of a heater may include performing temperature cycling of a PCR process or other nucleic acid amplification process.

The processor 116 may be connected to the target microfluidic networks 108, 110 to initiate the process, control the process, or allow information to be shared between the target microfluidic networks 108, 110 and with the processor 116. For example, the instructions 120 may initiate a nucleic acid testing process at the target microfluidic networks 108, 110 after or during sequenced ejection of fluid at the droplet ejectors 112, 114. Further, a parameter of a subsequent process to be performed at a target microfluidic network 108, 110 may be adjusted based on final or intermediate results from a process performed at a target microfluidic network 108, 110. That is, feedback may be shared among different target microfluidic networks 108, 110.

In an example nucleic acid testing process, fluid provided to the chamber 102 may include, for example, a DNA/RNA sample, a lysis buffer, washing solution, an elution buffer, a PCR master mix, and similar. Fluid may be provided to the chamber 102 in a time-controlled manner, so that desired fluid may be drawn into each target microfluidic network 108, 110.

A nucleic acid testing process may be divided into a plurality of portions that may be performed in parallel. For example, a first portion of a nucleic acid testing process may be performed at the first target microfluidic network 108 and a second portion of the nucleic acid testing process may be performed at the second target microfluidic network 110. Information from one portion of the process may be shared with another portion of the process via, for example, the processor 116.

Different nucleic acid testing processes may be performed by the target microfluidic networks 108, 110 and such processes may differ by virtue of a different reagent, different reagent concentration, different DNA/RNA sample, or the like.

Fluid movement through system 100 may be controlled by the droplet ejectors 112, 114 without the need for other active components, such as valves, for isolation of fluid having different properties or contents. Further, back flow of fluid from one channel 104, 106 to another channel 104, 106 may be prevented by capillary resistance provided by the droplet ejectors 112, 114. As such, a subprocess may be performed at each target microfluidic networks 108, 110 with an expected fluid that may be generated within the mesofluidic chamber 102.

In some examples, the devices and systems described herein can be used with a method for sequencing flow of fluid through target microfluidic networks. An example method includes providing fluid to a chamber. The chamber feeds a first channel terminating at a first droplet ejector and a second channel terminating at a second droplet ejector. The method further includes sequencing ejection of droplets at the first droplet ejector and the second droplet ejector to induce negative pressure to provide a sequenced output flow of the fluid through the first channel to a first target microfluidic network and through the second channel to a second target microfluidic network. The method further includes controlling the first and second target microfluidic networks to perform an analytical process with the fluid.

The method can include providing different fluids to the chamber according to a sequenced input flow, in which different fluids are introduced to the chamber at different times.

The method can further include sequencing ejection of droplets at the first droplet ejector and the second droplet ejector based on the sequenced input flow of the different fluids.

The method can further include ejecting the different fluids into the chamber using different droplet ejectors.

The method can further include sequencing ejection of droplets at the first droplet ejector and the second droplet ejector based on a hold time of the fluid in the chamber.

The method can further include performing a first portion of a nucleic acid testing process at the first target microfluidic network and performing a second portion of the nucleic acid testing process at the second target microfluidic network.

Figure 2:
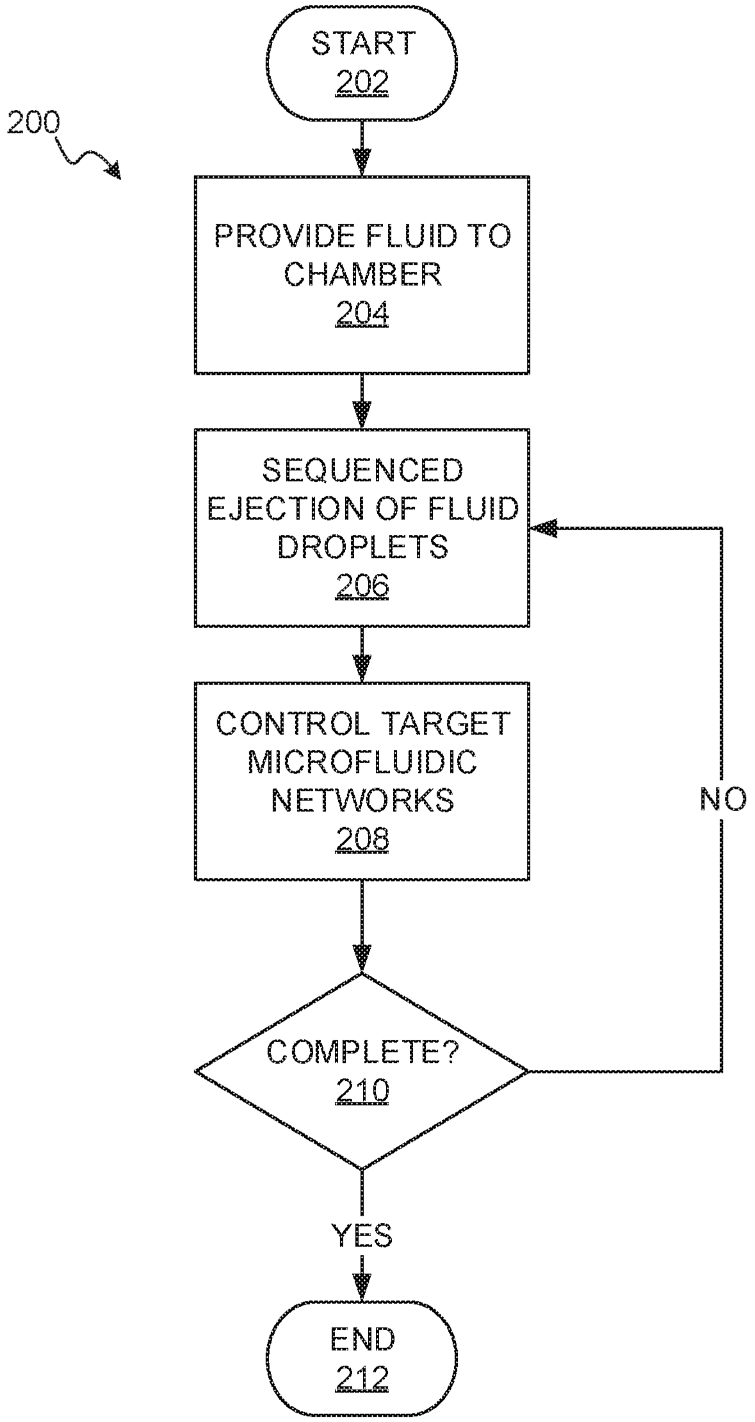
FIG. 2 is a flowchart of an example method that uses droplet ejection to sequence flow of fluid through microfluidic networks.

FIG. 2 shows an example method 200 of droplet ejection to sequence flow of fluid through target microfluidic networks. The method 200 may be performed by any of the systems and devices described herein. The method starts at block 202.

At block 204, fluid is provided to a mesofluidic chamber that communicates with a plurality of target microfluidic networks. For example, fluid may be ejected into the chamber by a droplet ejector. Mixing, reacting, accumulating, or other fluid manipulation may be performed on fluid within the chamber.

Next, at block 206, fluid is ejected in a sequenced manner from droplet ejectors positioned downstream of the target microfluidic networks to induce a sequenced output flow of fluid from the chamber, through respective channels, and into the target microfluidic networks. Droplet ejection draws fluid from the chamber into a target microfluidic network by inducing negative pressure downstream of the target microfluidic network. The ejection sequence may be selected to bring fluid into each microfluidic network at the appropriate time for cooperative performance of an analytical process by the target microfluidic networks. The ejection sequence may be selected to perform multiple different analytical processes in different target microfluidic networks in a parallel and time-efficient manner.

At block 208, the target microfluidic networks are controlled to perform an analytical process with the sequenced delivery of fluid. The target microfluidic networks may cooperate, perform parallel subprocesses, perform independent processes, or function according to another methodology. Control may be effected by the fluid flowing through the target microfluidic networks, and hence, determined by the ejection of droplets at the droplet ejectors. Control may also or alternatively be effected by processor, which may also control the droplet ejectors. Such a processor may directly control active components of the target microfluidic networks.

Once the analytical process is complete, at block 210, the method ends, at block 212.

Figure 3:
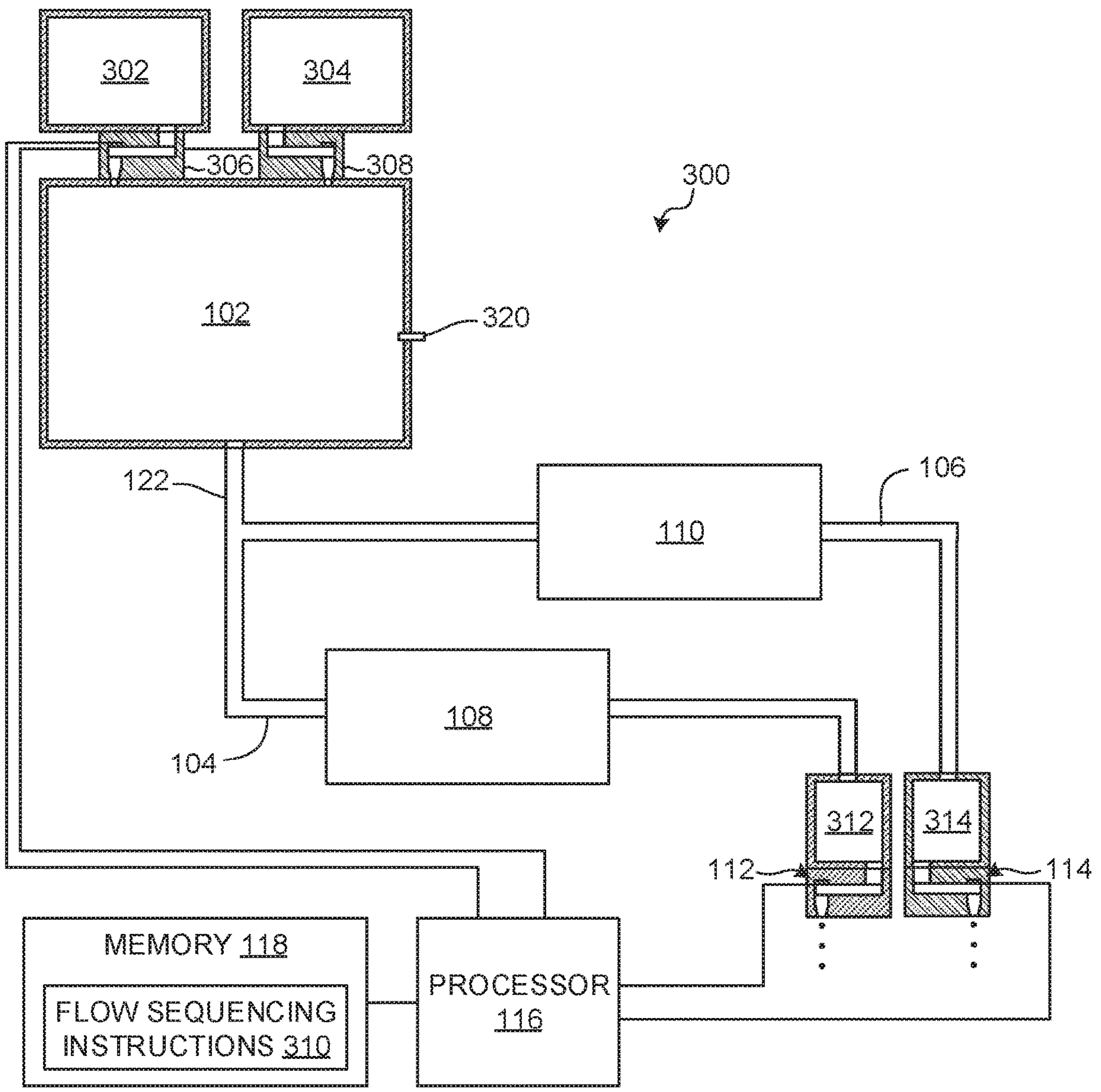
FIG. 3 is a schematic diagram of an example system that uses input and output droplet ejection to sequence flow of fluid through microfluidic networks.

FIG. 3 shows an example system 300. Features and aspects of the other devices and systems described herein may be used with the system 300 and vice versa. Like reference numerals denote like elements and description of like elements is not repeated here.

The system 300 includes a plurality of source fluid reservoirs 302, 304 to feed different fluids to a mesofluidic chamber 102 that feeds fluid to a plurality of microfluidic networks 108, 110.

Fluid may be provided to the chamber 102 by droplet ejectors 306, 308 in communication with respective fluid reservoirs 302, 304. That is, fluid may be ejected into the chamber 102 to accumulate, mix, react, be concentrated, or undergo another manipulation in advance of or contemporaneously with fluid being drawn from the chamber 102 into the plurality of microfluidic networks 108, 110 by negative pressure induced by operation of downstream droplet ejectors 112, 114.

Further, as shown, the system 300 may include downstream fluid reservoirs 312, 314. A first fluid reservoir 312 may communicate the first channel 104 to the first droplet ejector 112 and may supply a volume of drive fluid to be ejected by the first droplet ejector 112. A second fluid reservoir 314 may communicate the second channel 106 to the second droplet ejector 114 and may supply a volume of drive fluid to be ejected by the second droplet ejector 114.

Processor-executable flow sequencing instructions 310 may provide different fluids to the chamber 102 with the input droplet ejectors 306, 308 according to a sequenced input flow. That is, different fluids may be introduced to the chamber 102 at different times by the different input droplet ejectors 306, 308. Sequenced input flow may be controlled according to the accumulating, mixing, reaction, concentrating, or other manipulation performed at the chamber 102.

The processor-executable flow sequencing instructions 310 may further effect sequenced ejection of droplets at the downstream droplet ejectors 112, 114 based on the sequenced input flow of the different fluids into the chamber 102. That is, a sequence followed to draw fluid into the microfluidic networks 108, 110 may be based on the sequenced generation of the fluid at the chamber 102 using the input droplet ejectors 306, 308. Input and output flow may be coordinated.

The processor-executable flow sequencing instructions 310 may sequence ejection of droplets at the downstream droplet ejectors 112, 114 based on a hold time of fluid in the chamber 102. A hold time may be used to allow mixing, concentrating, reacting, or similar manipulation to complete. As such, after ejection of droplets into the chamber 102 by the input droplet ejectors 306, 308, activation of the downstream droplet ejectors 112, 114 may be delayed so that a suitable fluid is generated at the chamber 102 prior to such fluid being drawn through the target microfluidic networks 108, 110.

The processor-executable flow sequencing instructions 310 may sequence ejection of droplets at the downstream droplet ejectors 112, 114 based on a volume of fluid in the chamber 102. Volume may be computed from droplet ejection rate into the chamber 102. That is, a volumetric flow rate of input droplet ejectors 306, 308 may be stored in memory for reference by the instructions 310. A correlation of volumetric flow rates, such as a lookup table or function, may be provided for different ejection frequencies. Alternatively or additionally, as sensor 320 may be connected to the processor 116 and may be provide at the chamber 102. For example, sensing electrodes may be provided to the chamber 102 to determine volume of fluid in the chamber 102. Other types of sensors, such as inductive sensors, may be used. As such, a downstream droplet ejector 112, 114 may be activated when a particular volume of fluid is determined to be present in the chamber 102.

Figure 4:
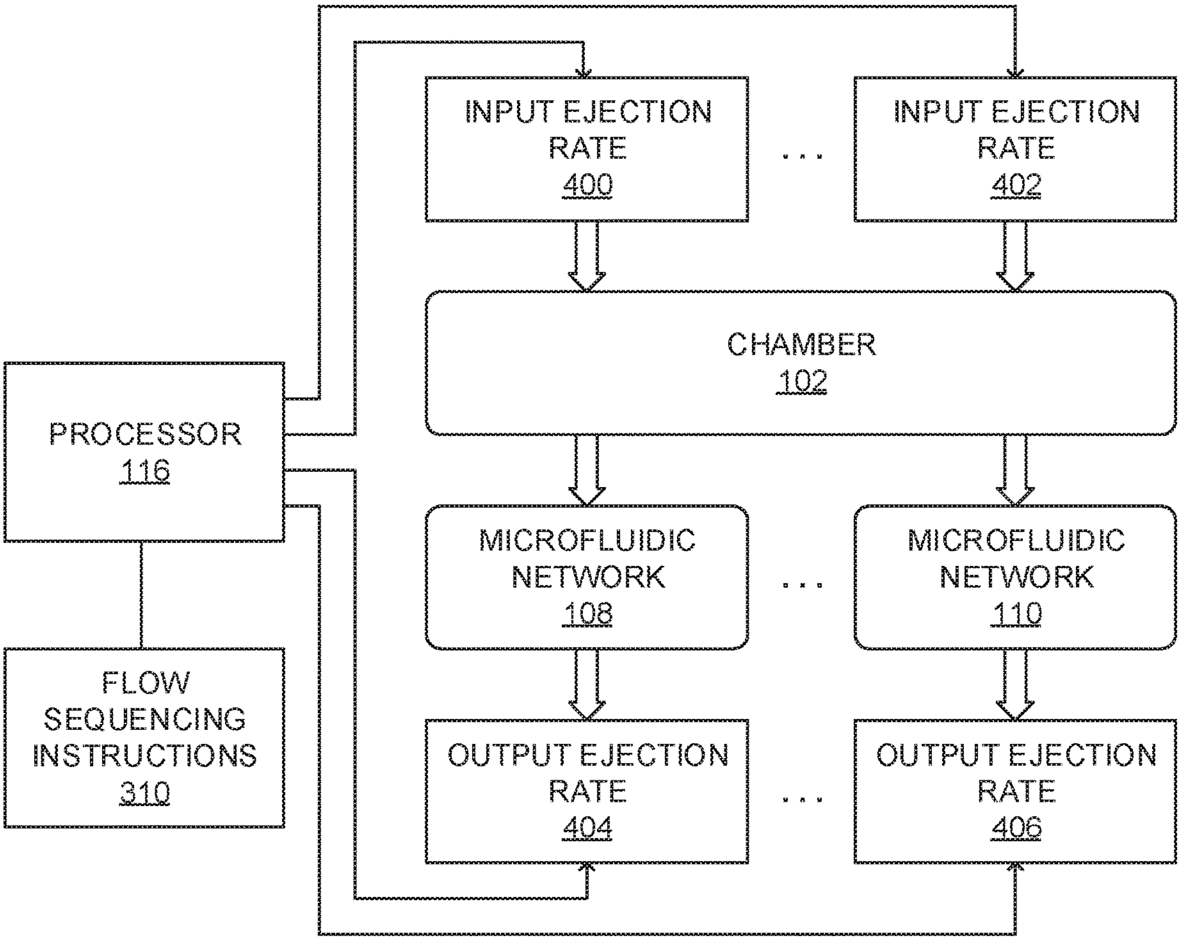
FIG. 4 is a control diagram of example input and output droplet ejection to sequence flow of fluid through microfluidic networks.

As shown in FIG. 4, flow sequencing instructions 310 may control input droplet ejection rates 400, 402 of any number of droplet ejectors positioned provide different fluids to a mesofluidic chamber 102. Each fluid may be fed into the chamber 102 at a specific flow rate that may be controlled by a frequency of droplet ejection and a quantity of droplet ejection nozzles that are activated.

Input droplet ejection rates 400, 402 may be varied over time to provide a specific fluid at the chamber 102. As such, fluid may be mixed, reacted, accumulated, concentrated, or otherwise generated in the chamber 102. Such fluid may then be selectively provided to target microfluidic networks 108, 110 positioned downstream of the chamber 102.

The flow sequencing instructions 310 may further control output droplet ejection rates 404, 406 of any number of droplet ejectors positioned downstream of the target microfluidic networks 108, 110 to draw selected fluid into the target microfluidic networks 108, 110. That is, when the chamber 102 contains a specific fluid that is intended for a specific target microfluidic network 108, 110, then the respective droplet ejection rate 404, 406 is controlled to draw the specific fluid into the specific target microfluidic network 108, 110 at a specific flow rate. The specific flow rate may be controlled by a frequency of droplet ejection and a quantity of droplet ejection nozzles that are activated. At the same time, other droplet ejection rates 404, 406 may be controlled to stop.

An increase to an output droplet ejection rate 404, 406 may be controlled to lag an increase to an input droplet ejection rate 400, 402 and such delay in movement of fluid from the chamber 102 may be used to implement a dwell time, to allow a reaction sufficient time to perform, or fora similar purpose.

The chamber 102 acts as a mesofluidic interface between the input microfluid flow and output microfluidic flow. As such, the chamber 102 reduces complexity for mixing, reaction, or other fluid manipulation process that would otherwise require increased complexity to implement at the microfluidic scale.

Figure 5:
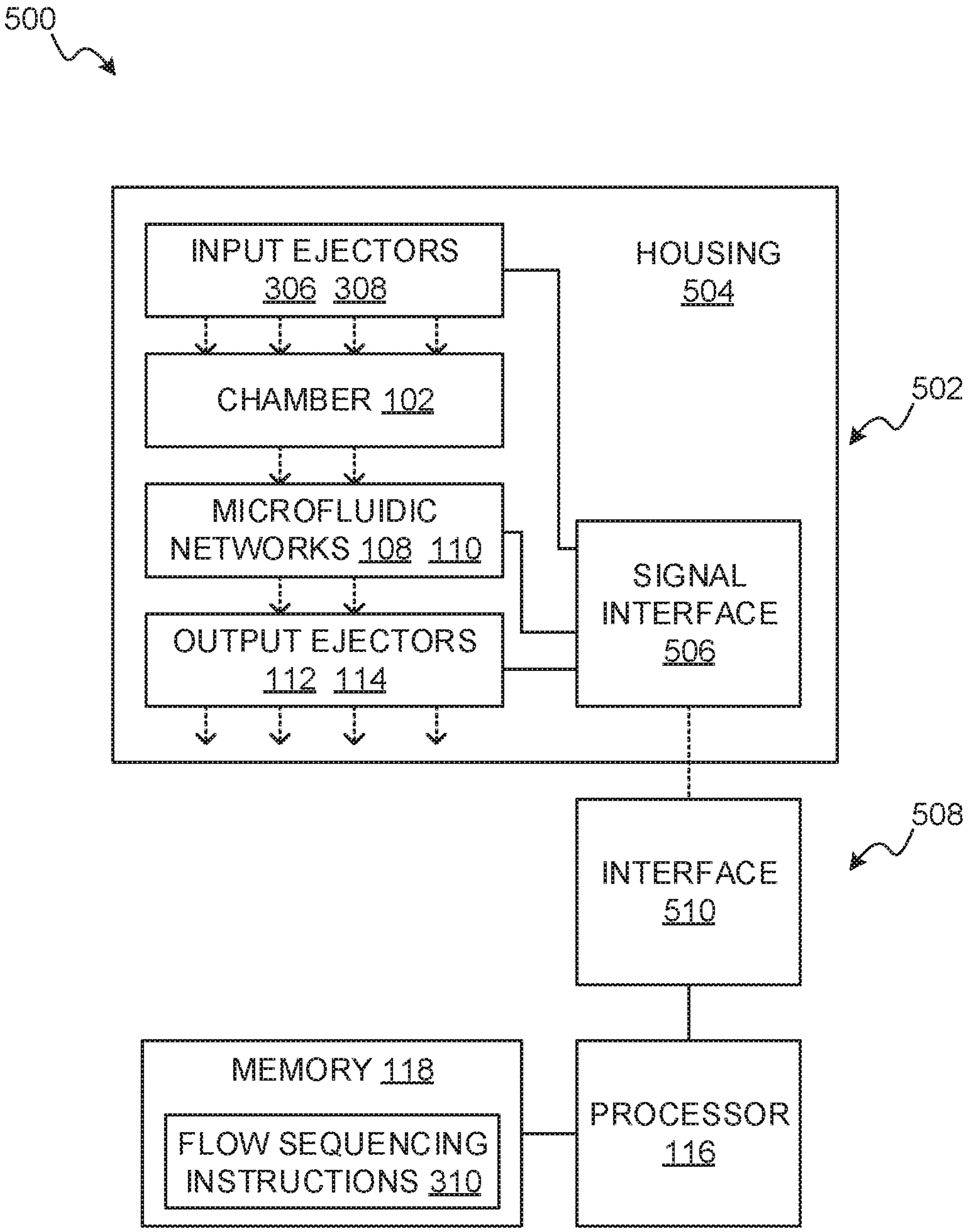
FIG. 5 is a schematic diagram of an example system that uses a cartridge for droplet ejection to sequence flow of fluid through microfluidic networks.

FIG. 5 shows an example system 500. Features and aspects of the other devices and systems described herein may be used with the system 500 and vice versa. Like reference numerals denote like elements and description of like elements is not repeated here.

The system 500 includes a cartridge 502 including plurality of input droplet ejectors 306, 308 that dispense different fluids to a mesofluidic chamber 102, a plurality of target microfluidic networks 108, 110 in fluid communication with the chamber 102, and a plurality of output droplet ejectors 112, 114 that induce negative pressure to draw fluid from the chamber 102 into the target microfluidic networks 108, 110. Such components may be contained within a cartridge housing 504.

The cartridge 502 further includes a signal interface 506 at the housing 504. The signal interface 506 is electrically connected to the droplet ejectors 306, 308, 112, 114 to receive a signal to sequence ejection of droplets to provide fluid to the chamber 102 and draw the fluid through target microfluidic networks 108, 110. The signal interface 506 may include an electrical contact.

The system 500 further includes an analysis device 508. The analysis device 508 includes a memory 118 and processor 116. The memory 118 may store flow sequencing instructions 310 for execution by the processor 116. The processor 116 is connected to an interface 510 that may include an electrical contact. The interface 510 provides for communications with the processor 116.

The cartridge 502 is removably mechanically connected to the analysis device 508. When the cartridge 502 is mechanically connected to the analysis device 508, the signal interface 506 of the cartridge 502 electrically connects to the interface 510 of the analysis device 508, so that the processor 116 may control the droplet ejectors 306, 308, 112, 114 and the target microfluidic networks 108, 110 according to the flow sequencing instructions 310. When the analytical process implemented by the cartridge 502 is complete, the resulting information may be communicated to the memory 118 or otherwise outputted and the cartridge 502 may be disconnected from the analysis device 508 and discarded.

Figure 6:
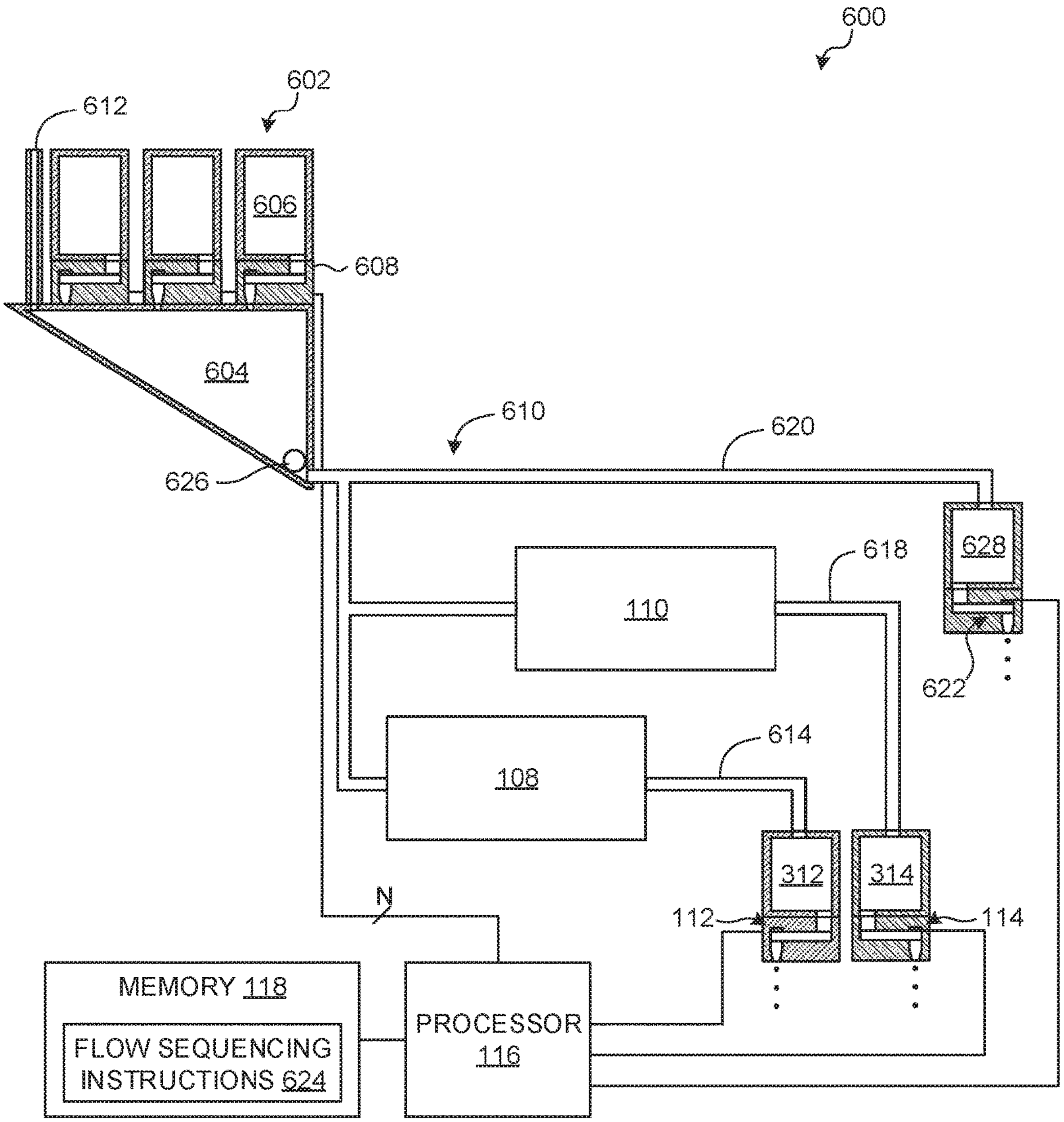
FIG. 6 is a schematic diagram of an example system that uses sequenced input and output droplet ejection to perform a nucleic acid amplification process.

FIG. 6 shows an example system 600 for a nucleic acid testing process. Features and aspects of the other devices and systems described herein may be used with the system 600 and vice versa. Like reference numerals denote like elements and description of like elements is not repeated here.

The system 600 includes a plurality of fluid ejection units 602 positioned to dispense fluid into a mesofluidic chamber 604. Each ejection unit includes a fluid reservoir 606, which may be preloaded or loaded at time of use, and an array of droplet ejectors 608. Different fluid ejection units 602 may provide different fluids to the mesofluidic chamber 604.

The chamber 604 may be funnel shaped to direct input fluid received from the fluid ejection units 602 to a fluid outlet that feeds a network of microfluidic channels 610. The chamber 604 includes a vent 612 to allow individual channels of the network of microfluidic channels 610 to function independently. A magnet 626, filter, or similar component that may be positioned near the outlet of the chamber 604 to interact with fluid in the chamber 604. In other examples, a magnet may be embedded in or attached to an inner wall of the funnel wall of the chamber 604. As such, a reagent may be made to contact or not contact the magnet, depending on relative positions of the magnet and the fluid ejection units 602. For example, magnetic material may be placed in the path of ejection of a particular fluid ejection unit 602 and outside a path of ejection of another fluid ejection unit 602.

The network of microfluidic channels 610 is communicates the chamber with first and second target microfluidic networks 108, 110 via first and second channels 614, 618 that terminate a respective first and second droplet ejectors 112, 114. Ejection of droplets at a droplet ejector 112, 114 induces a negative pressure that draws fluid from the chamber 604 through the respective target microfluidic network 108, 110.

The network of microfluidic channels 610 may further include a third channel 620 that feeds a waste droplet ejector 622 that serves to clear fluid from the chamber 604 without flowing through a target microfluidic network 108, 110. The waste droplet ejector 622 may connect with the third channel 620 via a fluid reservoir 628 that may be loaded with drive fluid. All output droplet ejectors 112, 114, 622 may eject to waste.

A processor 116 is connected to the droplet ejectors 608, 112, 114, 622 and activates the droplet ejectors 608, 112, 114, 622 based on flow sequencing instructions 624 that may be stored in a memory 118.

Fluid ejection units 602 may be provided for a wash buffer, an elution buffer, and a fluid containing a DNA/RNA sample. The flow sequencing instructions 624 may activate respective droplet ejectors to introduce the sample and wash buffer to the mesofluidic chamber 604 and draw resulting waste product through the waste channel 620. Sample material may be retained in the chamber 604 by a magnet 626, filter, or similar component that may be positioned near the outlet of the chamber 604. The flow sequencing instructions 624 may activate respective droplet ejectors to introduce elution buffer to the mesofluidic chamber 604 to elute the sample material and flow the resulting product through the first target microfluidic network 108. A nucleic acid application process may then be initiated at the first target microfluidic network 108. Fluid containing another sample may be ejected into the chamber 604 and the washing and elution processes may be repeated with resulting fluid being draw into the second target microfluidic network 110, so that many nucleic acid application processes may be performed in a parallel staged manner using a plurality of target microfluidic networks 108, 110.

An outcome of a test performed by a target microfluidic network 108 may be used to modify parameters of a subsequent test performed by the next target microfluidic network 110. For example, a low signal from a first DNA/RNA sample may be used to increase elution of a second DNA/RNA sample.

Figure 7:
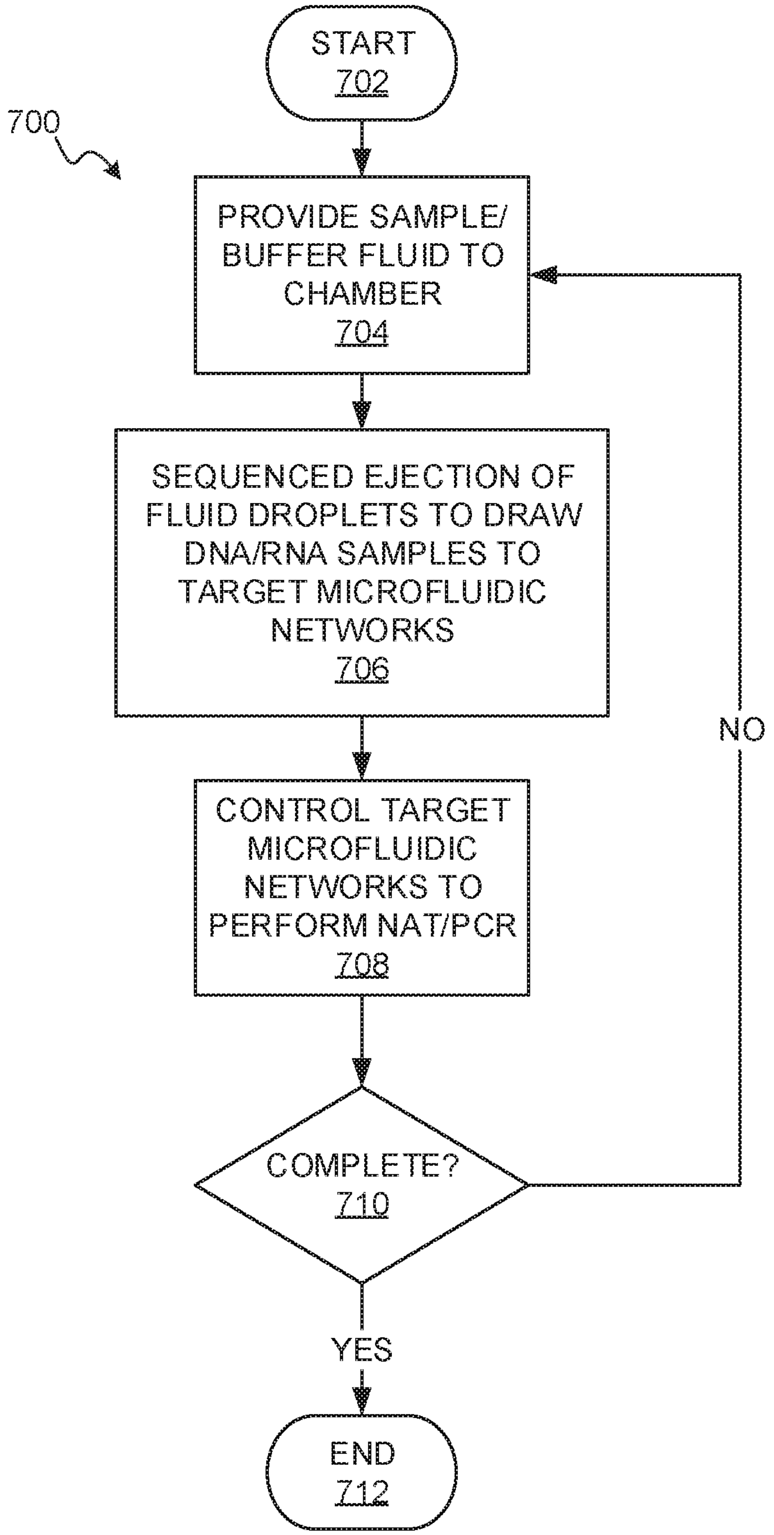
FIG. 7 is a flowchart of an example method that uses droplet ejection to sequence flow of fluid through microfluidic networks to perform a nucleic acid testing process.

FIG. 7 shows an example method 700 of droplet ejection to sequence flow of fluid through target microfluidic networks to perform a nucleic acid testing process. The method 700 may be performed by any of the systems and devices described herein, such as the system 600 which will be referenced as an example. The method starts at block 702.

At block 704, fluid is provided to a chamber that feeds a first channel terminating at a first droplet ejector and a second channel terminating at a second droplet ejector. Different fluids may be provided to the chamber according to a sequenced input flow, in which different fluids are introduced to the chamber at different times. Different fluids may be inputted into the chamber by ejecting the different fluids into the chamber using different input droplet ejectors. For example, different input fluid ejection units 602 may be provided with a wash buffer, an elution buffer, and a fluid containing a DNA/RNA sample, and droplets of these fluids may be ejected into the chamber 604 at different times.

At block 706, ejection of droplets at the first droplet ejector and the second droplet ejector, located downstream of the chamber, may be sequenced to induce negative pressure to provide a sequenced output flow of the fluid through the first channel to a first target microfluidic network and through the second channel to a second target microfluidic network. The sequencing of ejection of droplets at the first droplet ejector and the second droplet ejector may occur after a hold time of fluid in the chamber. That is, input fluid may be allowed time to mix, react, concentrate, accumulate, or undergo other fluid manipulation prior to fluid being drawn from the chamber. The sequencing of ejection of droplets at the first droplet ejector and the second droplet ejector may be based on the sequenced input flow of the different fluids into the chamber. That is, a plurality of DNA/RNA samples may be provided to the chamber at different times. For example, a first DNA/RNA sample ejected into the chamber 604, after washing and elution, may be drawn from the chamber 604 to the first target microfluidic network 108 by activation of the first droplet ejector 112. Subsequently, a second DNA/RNA sample ejected into the chamber 604, after washing and elution, may be drawn from the chamber 604 to the second target microfluidic network 110 by activation of the second droplet ejector 114.

At block 708, the first and second target microfluidic networks are controlled to perform an analytical process with fluid provided by action of the first and second droplet ejectors. For example, a FOR process may be performed by controlling a heater to temperature cycle fluid containing a DNA/RNA sample. A first portion of a nucleic acid testing process may be performed at the first target microfluidic network and a second portion of the nucleic acid testing process may be performed at the second target microfluidic network. For example, each of a plurality of working DNA/RNA samples provided to the chamber 604 in sequence may be drawn into the respective target microfluidic network 108, 110 in sequence to perform a plurality of PCR processes in a time-staggered and parallel manner. The plurality of working DNA/RNA samples are contemplated to be from the same origin to avoid contamination. For example, an ejection unit 602 may be loaded with an original DNA/RNA sample that is to be analyzed by sequenced dispensing of working samples into the chamber 102. Samples may differ in concentration, preparation (e.g., isolation, washing, elution, etc.), or other parameter.

The method 700 may be repeated for different input fluids, different input fluid sequences, different fluid manipulations in the chamber, different output fluid sequences, or different operations of a target microfluidic network, via block 710. The method 700 then ends at block 712.

As should be apparent from the above, droplet ejectors or arrays thereof are used to input fluid to a mesofluidic chamber and draw fluid from the mesofluidic chamber according to a controllable sequence. Different fluid flow paths through different downstream targets may be decoupled from each other and further may be decoupled from flow paths into the mesofluidic chamber. The mesofluidic chamber may be used to mix, react, accumulate, concentrate, or perform other fluid manipulation on different inputted fluids. Input fluid flow and fluid flow through different downstream targets may be sequenced according to the needs of an analytical process implemented, such as a nucleic acid testing process.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:

a non-transitory machine-readable medium including instructions that when executed by a processor cause the processor to:

control input of a fluid to a chamber, the chamber feeding a first channel terminating at a first droplet ejector and a second channel terminating at a second droplet ejector;

sequence an ejection of droplets at the first droplet ejector and the second droplet ejector to induce negative pressure to provide a sequenced output flow of the fluid through the first channel to a first target microfluidic network and through the second channel to a second target microfluidic network; and initiate an analytical process at the first and second target microfluidic networks;

wherein the instructions are further to sequence input flow of different fluids into the chamber at different times.

2. The device of claim 1, wherein the instructions are further to sequence ejection of droplets at the first droplet ejector and the second droplet ejector based on the sequenced input flow of the different fluids.

3. The device of claim 1, wherein the instructions are further to delay ejection of droplets at the first droplet ejector and the second droplet ejector by a hold time of the fluid in the chamber.

4. The device of claim 1, wherein the instructions are further to initiate a nucleic acid testing process as the analytical process.

5. The device of claim 4, wherein the instructions are further to perform a first portion of a nucleic acid testing process at the first target microfluidic network and perform a second portion of the nucleic acid testing process at the second target microfluidic network.

6. The device of claim 1 further comprising:

the processor electrically connected to the non-transitory machine-readable medium; and an interface electrically connected to the processor, the interface to receive electrical connection of a removable cartridge, the removable cartridge including the chamber, the first channel, the first droplet ejector, the second channel, the second droplet ejector, the first target microfluidic network, and the second target microfluidic network.

7. The device of claim 6, further comprising an input droplet ejector to provide the fluid to the chamber.

* * * * *